(12) United States Patent
Yu et al.

(10) Patent No.: US 8,382,049 B2
(45) Date of Patent: Feb. 26, 2013

(54) SUPPORT DEVICE

(75) Inventors: Chia-Te Yu, New Taipei (TW); Lin-Lin Pan, Shenzhen (CN); Liang-Yi Lu, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/323,967

(22) Filed: Dec. 13, 2011

(65) Prior Publication Data

US 2012/0325988 A1 Dec. 27, 2012

(30) Foreign Application Priority Data

Jun. 23, 2011 (CN) .......................... 2011 1 0170611

(51) Int. Cl.
*F16M 11/38* (2006.01)
(52) U.S. Cl. .................. 248/166; 248/163.1; 248/176.1; 248/460; 248/461; 248/918

(58) Field of Classification Search .................. 248/460, 248/461, 435, 166, 434, 918, 176.1, 163.1
See application file for complete search history.

(56) References Cited

U.S. PATENT DOCUMENTS

| 987,547 | A | * | 3/1911 | Caputi | 248/461 |
|---|---|---|---|---|---|
| 1,368,317 | A | * | 2/1921 | Zondlo | 248/461 |
| 3,031,247 | A | * | 4/1962 | Schieve | 312/231 |
| 4,149,763 | A | * | 4/1979 | Delahaie | 312/231 |
| 4,421,943 | A | * | 12/1983 | Withjack | 136/246 |
| 5,452,951 | A | * | 9/1995 | Peller | 312/310 |
| 7,041,890 | B1 | * | 5/2006 | Sutton | 84/477 R |
| 7,208,666 | B2 | * | 4/2007 | Burch et al. | 84/327 |

* cited by examiner

*Primary Examiner* — Amy J Sterling
(74) *Attorney, Agent, or Firm* — Altis Law Group, Inc.

(57) ABSTRACT

A support device includes a support element, a plurality of legs rotatably connected to the support element which can be rotated to be changed from an unfolded state and a folded state, and a main body sleeves the support element. When the legs are rotated to be in the unfolded state, the legs cooperate with the support element to support an electronic device, and when the legs are rotated to be in the folded state, the main body sleeves on the support element receiving the legs.

13 Claims, 5 Drawing Sheets

SUPPORT DEVICE

BACKGROUND

1. Technical Field

The present disclosure relates to support devices and, particularly, to a support device for supporting portable electronic devices.

2. Description of Related Art

Hand-held electronic devices, such as PDAs, often use docking stations for support. However, some docking stations cannot be folded and are an inconvenience when being carried and take a large amount of space.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
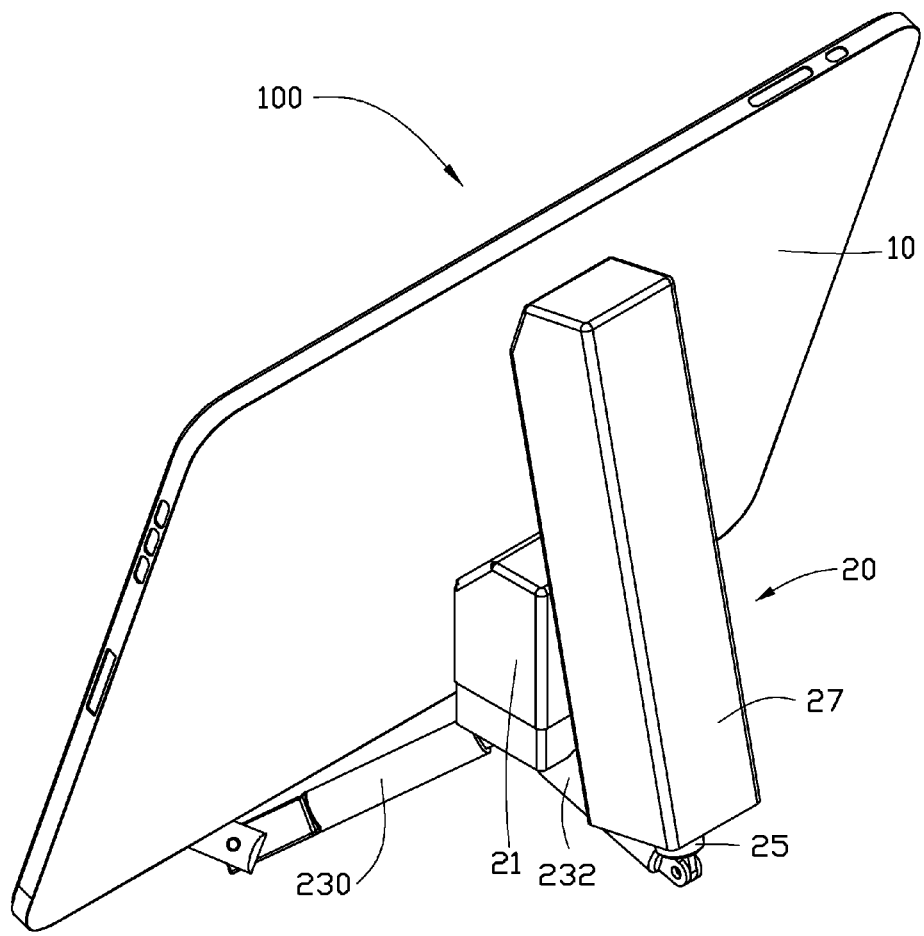
FIG. 1 is an isometric view of an electronic device assembly in accordance with an embodiment, showing a support device supporting an electronic device.

Referring to FIG. 1, an embodiment of an electronic device assembly 100 is illustrated. The assembly 100 includes an electronic device 10 and a support device 20 for supporting the electronic device 10. The electronic device 10 may be a panel computer. The support device 20 can be in an unfolded state and a folded state. When in use, the support device 20 is unfolded to support the electronic device 10. When not in use, the support device 20 is folded.

Figure 2:
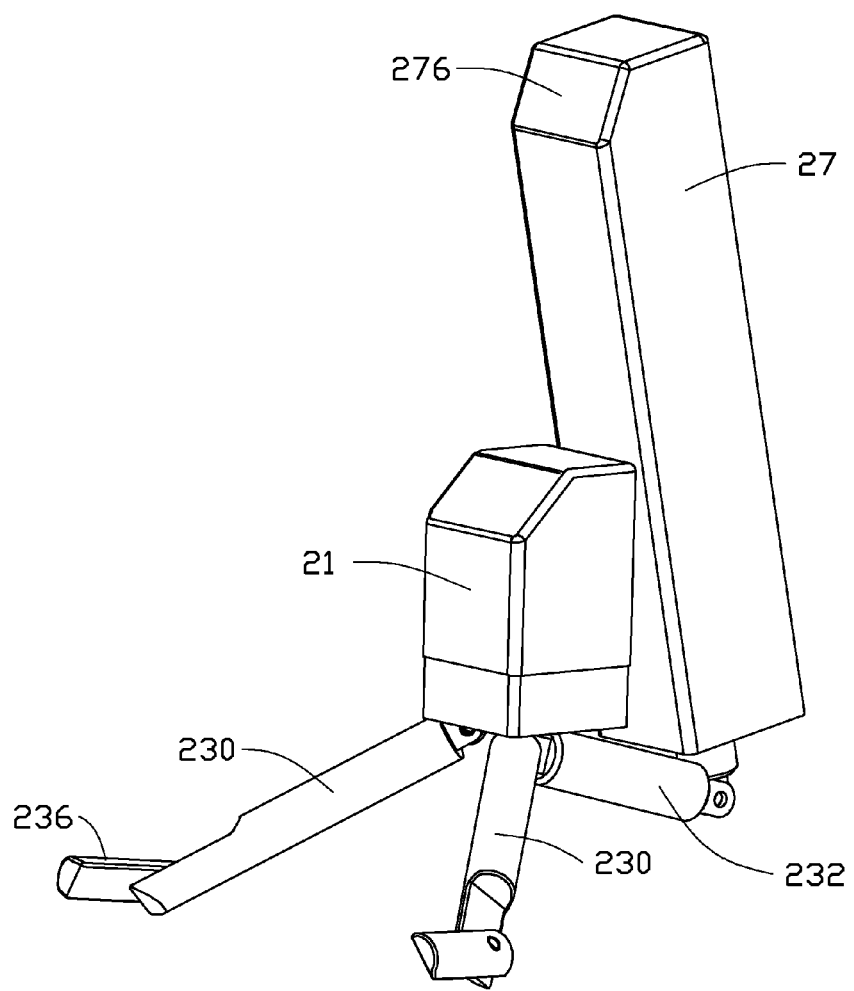
FIG. 2 is a first isometric view of the support device of FIG. 1, showing the support device in an unfolded state.
Figure 3:
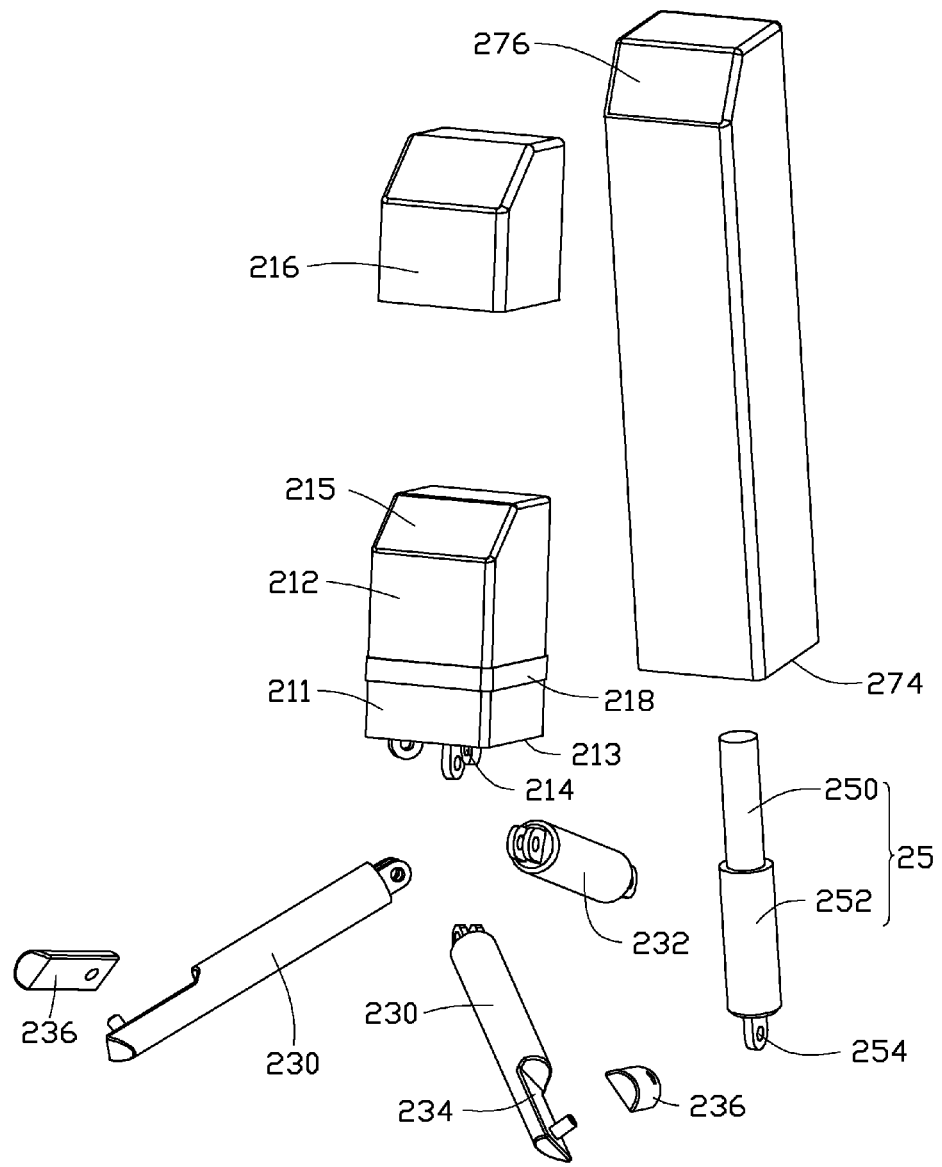
FIG. 3 is an exploded, perspective view of the support device of FIG. 1.

Referring also to FIGS. 2-3, the support device 20 includes a support element 21, three legs (hereinafter, two first legs 230 and one second leg 232), a connecting element 25, and a main body 27. The connecting element 25 is secured to the main body 27. One end of each of the first and second leg 230, 232 is rotatably connected to the support element 21. The other end of the second leg 232 is rotatably connected to one end of the connecting element 25. The main body 27 and the legs 230, 232 are capable of being sleeved by the support element 21 and the connecting element 25.

The support element 21 is substantially parallelepiped shaped, and may be made of plastic. The support element 21 includes a bottom portion 211 and a top portion 212. A protrusion 218 protrudes from the joint of the top and bottom portions 211, 212 to form a step. The bottom portion 211 includes a bottom surface 213. Three connecting protrusions 214 are arranged on the bottom surface 213 and each corresponds to one of the first and second legs 230, 232. The top portion 212 defines a first support surface 215, which can contact the back surface of the electronic device 10 to support the electronic device 10 when the support device 20 is unfolded. In this embodiment, the first support surface 215 has an inclined surface. The support element 21 further includes a shell 216, which can sleeve on the top portion 212. The shape of the shell 216 matches that of the top portion 212 to allow the top potion 212 to be fitted into the shell 216. In an alternative embodiment, the shell 216 may be integrally formed with the top portion 212.

An end of each of the first and second legs 230, 232 is rotatably coupled to an end of the support element 21, and frictional forces are present between the support element 21 and each first and second legs 230, 232 to hinder the smooth and free rotation of the first and second legs 230, 232. The length of the first and second legs 230, 232 is the same. Two support blocks 236 are respectively rotatably connected to the other end of the first legs 230 opposite to the support element 21, to prevent the electronic device 10 from falling off the support device 20. The support blocks 236 can be rotated to be parallel to a support surface, such as a table, and cooperate with the support element 21 to support the electronic device 10. In the embodiment, a portion of an end of the first leg 230 opposite to the first element 21 is cut off to define a cutout 234, for receiving the support blocks 236. The cutouts 234 are fitted with the support blocks 236.

The main body 27 is substantially parallelepiped shaped, and the length is greater than that of the support element 21. The main body 27 defines a longitudinal receiving space 274 with an opening 2741. The receiving space 274 is used for receiving the connecting element 25, the first and second legs 230, 232 and the bottom portion 211 of the first element 21. The total size of the cross-section of the first and second legs 230, 232 is less than the size of the opening 2741. The depth of the receiving space 274 is greater than the total height of the bottom portion 211 and one of the first and second legs 230, 232. The shape of the opening 2741 is the same as that of the cross-section of the bottom portion 211, and the size of the opening 2741 is equal to that of the cross-section of the bottom portion 211. Thus the first and second legs 230, 232, and the bottom portion 211 can be pushed into the receiving space 274, and the top portion 212 cannot be pushed into the receiving space 274 because of the step formed by the protrusion 218. The main body 27 further defines a second support surface 276 on a top end of the support device 27 opposite to the opening 2741. The second support surface 276 can support the electronic device 10 when unfolded. In this embodiment, the second support surface 276 is also an inclined surface.

The connecting element 25 is telescopic. The connecting element 25 includes a fixing portion 250 secured to the main body 27 and a sliding portion 252 slidably arranged over the fixing portion 250. The fixing portion 250 is received in the receiving space 274. The sliding portion 252 is capable of sliding relative to the fixing portion 250 to extend out of the opening 2741.

In assembly, the fixing portion 250 is secured to the main body 27, the sliding portion 252 is slidably arranged over the fixing portion 250. An end of the second leg 232 is rotatably connected to the sliding portion 252 by the round hole 254, and the other end of the second leg 232 is rotatably coupled to one of the connecting protrusions 214.

An end of each first leg 230 is rotatably coupled to one of the other two connecting protrusions 214.

Figure 5:
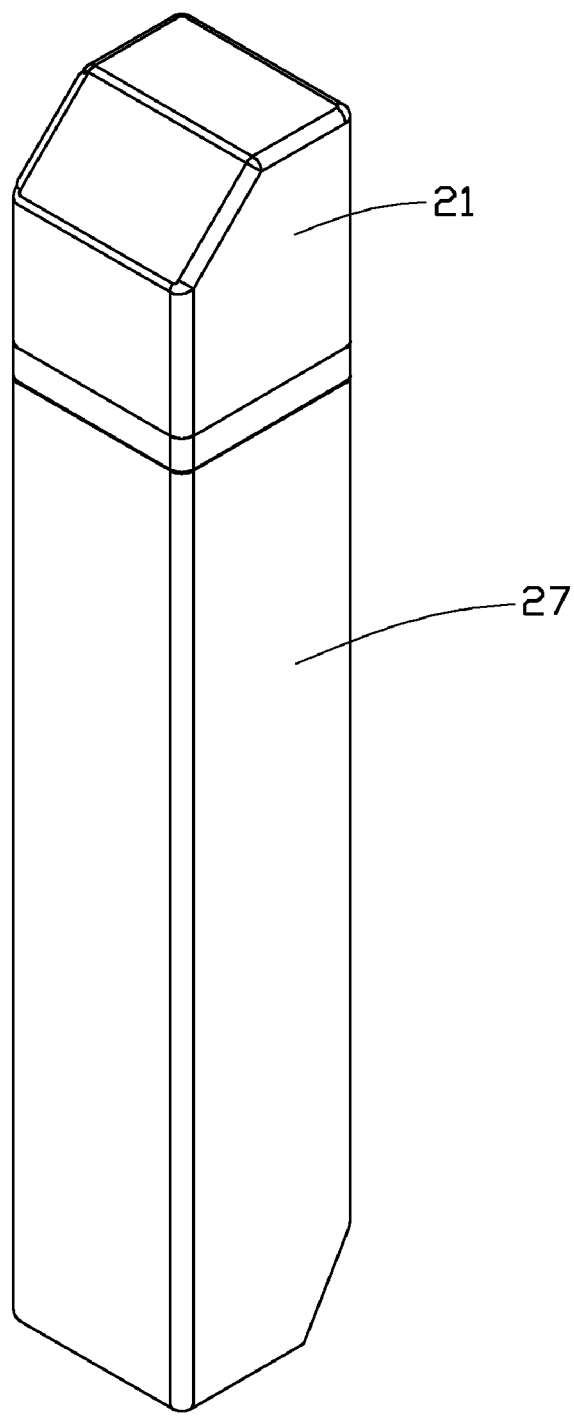
FIG. 5 is a third isometric view of the support device of FIG. 1, showing the support device in a fully folded state.

Referring to FIG. 5, after assembly, the first and second legs 230, 232 are folded to be parallel to the support element 21 and the connecting element 25. The sliding portion 252, the first and second legs 230, 232, and the bottom portion 211 are pushed into the received space 274 with the bottom portion 211 of the main body 210 received the receiving space 274, and the support device 20 is in the folded state.

Figure 4:
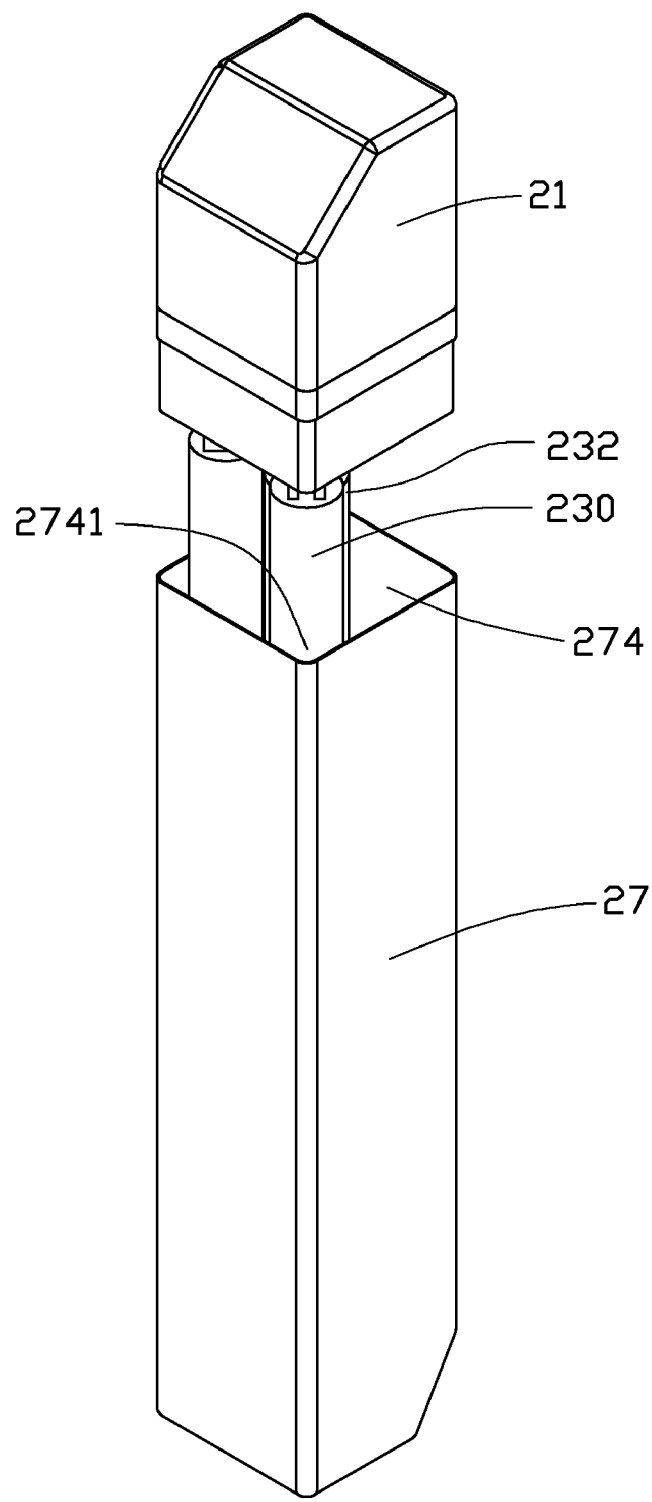
FIG. 4 is a second isometric view of the support device of FIG. 1, showing the support device in a partially folded state.

Referring to FIGS. 4 and 2, to use the support device 20 to support the electronic device 10. First, the bottom portion 211, the first and second legs 230, 232, and the sliding portion 252 are pulled out of the receiving space 274. Second, the second leg 232 is rotated relative to the sliding portion 252 to drive the support element 21 adjacent to the main body 27. Third, the first and second legs 230, 232 are respectively rotated around the connecting portions 214 to be unfolded as a tripod. Then, the support blocks 236 are rotated parallel to the support surface. At this time, the support device 20 can support the electronic device 10 with the bottom portion laid on the support blocks 236 and the back portion supported by the support element 21. Furthermore, the main body 27 can also be rotated to support the top portion of the back of the electronic device 10, such that the electronic device 10 can be steadily supported.

When in not use, the support blocks 236 are rotated to be received in the cutout 234, and the first and second legs 230, 232 are rotated to be folded parallel to the support element 21. The second leg 232 is then rotatably aligned with the connecting element 25. At this time, the support element 21 can be pushed toward the main body 27 to cause the bottom portion 211, the legs 230, 232, 234, and the sliding portion 252 to be received in the receiving space 274, and the support device 20 is in the folded state.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A support device comprising:
    a support element;
    a plurality of legs rotatably connected to the support element and capable of being in an unfolded state and a folded state;
    a main body capable of sleeving the legs and part of the support element; and
    a connecting element for rotatably connecting the main body to an end of one of the legs opposite to the support element;
    wherein when the legs are rotated to be in the unfolded state, the legs cooperates with the support element to support an electronic device, and when the legs are rotated to be in the folded state, the main body sleeves on the support element with the legs being received therein; wherein the main body defines a receiving space with an opening; the connecting element is received in the receiving space, the connecting element is telescopic and is able to be pulled out of the receiving space and pushed into the receiving space.

2. The support device as described in claim 1, wherein the connecting element comprises a fixing portion and a sliding portion slidably coupled to the fixing portion, the fixing portion is secured to the main body and is received in the receiving space, the sliding portion is capable of sliding out of the opening.

3. The support device as described in claim 2, wherein one of the legs is rotatably coupled to an end of the sliding portion opposite to the fixing portion.

4. The support device as described in claim 1, further comprising a plurality of support blocks respectively corresponding to and rotatably coupled to the legs, each support block is able to be rotated around the corresponding leg to be in a position where the support block is able to support a bottom of the electronic device.

5. The support device as described in claim 1, wherein the support element comprises a bottom portion, the legs are rotatably connected to the bottom portion.

6. The support device as described in claim 5, wherein the size of the cross-section of the bottom portion is less than that of the opening, and the bottom portion is able to be pushed into the receiving space.

7. The support device as described in claim 1, wherein the height of the support element is less than that of the main body.

8. The support device as described in claim 7, wherein the main body can be used to cooperate with the support element to support the electronic device.

9. A support device comprising:
    a support element;
    a plurality of legs rotatably coupled to the support element, the legs capable of being in an unfolded state and a folded state;
    a main body defining a receiving space having an opening, the receiving space for receiving the legs and a portion of the support element;
    a connecting element for rotatably connecting the main body to an end of one of the legs opposite to the support element; and
    a plurality of support blocks respectively corresponding to and rotatably coupled to the legs, each support block is able to be rotated around the corresponding leg to be in a position where the support block is able to support a bottom of the electronic device;
    wherein when the legs are rotated to be in the unfolded state, the support element, the legs, the connecting element, and the main body cooperates with each other to support an electronic device, and when the legs are rotated to be in the folded state, a portion of the support element and the legs are capable of being received in the receiving space.

10. The support device as described in claim 9, wherein the height of the support element is less than that of the main body.

11. The support device as described in claim 9, wherein the connecting element is telescopic, and comprises one end being secured to the main body and receiving in the receiving space and the other end being extending out of the opening.

12. The support device as described in claim 9, wherein the support element comprises a bottom portion, the legs are rotatably connected to the bottom portion.

13. The support device as described in claim 12, wherein the size of the cross-section of the bottom portion is less than that of the opening, and the bottom portion is able to be pushed into the receiving space.

* * * * *